No. 12,264. REISSUED AUG. 23, 1904.

G. J. SENGBUSCH.

INKSTAND.

APPLICATION FILED MAY 31, 1904.

2 SHEETS—SHEET 1.

Witnesses,
R. S. Mann,
A. N. Graves

Inventor,
Gustav J. Sengbusch,
By Offield Towle & Linthicum,
Attys.

No. 12,264. REISSUED AUG. 23, 1904.

G. J. SENGBUSCH.

INKSTAND.

APPLICATION FILED MAY 31, 1904.

2 SHEETS—SHEET 2.

Witnesses,
F. S. Mann,
A. N. Graves.

Inventor,
Gustav J. Sengbusch,
By Offield Towle & Linthicum,
Attys.

No. 12,264. Reissued August 23, 1904.

UNITED STATES PATENT OFFICE.

GUSTAV J. SENGBUSCH, OF MILWAUKEE, WISCONSIN.

INKSTAND.

SPECIFICATION forming part of Reissued Letters Patent No. 12,264, dated August 23, 1904.

Original No. 726,194, dated April 21, 1903. Application for reissue filed May 31, 1904. Serial No. 210,584.

*To all whom it may concern:*

Be it known that I, GUSTAV J. SENGBUSCH, a citizen of the United States, residing at Milwaukee, in the county of Milwaukee and State of Wisconsin, have invented certain new and useful Improvements in Inkstands, of which the following is a specification.

This invention relates to automatic fountain-inkstands, especially those having a floating feed-controller or buoyant stopper which obviates the entrance of dust or dirt into the inkstand and prevents evaporation of the ink and at the same time permits ready access to the ink for dipping a pen.

The invention consists in the construction and arrangement of the several parts, which will be more fully hereinafter described and claimed.

Figure 1:
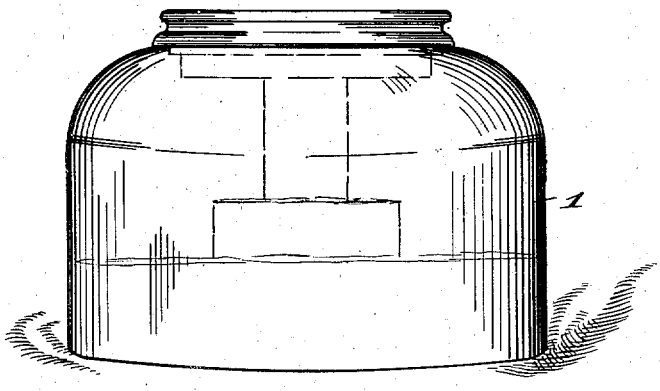
Figure 6:
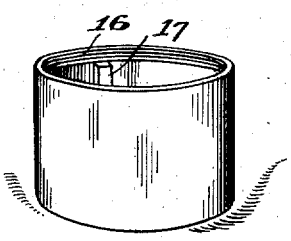
Figure 7:
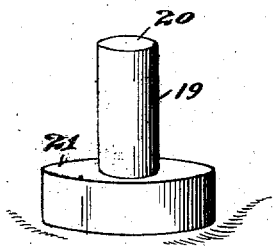
Figure 3:
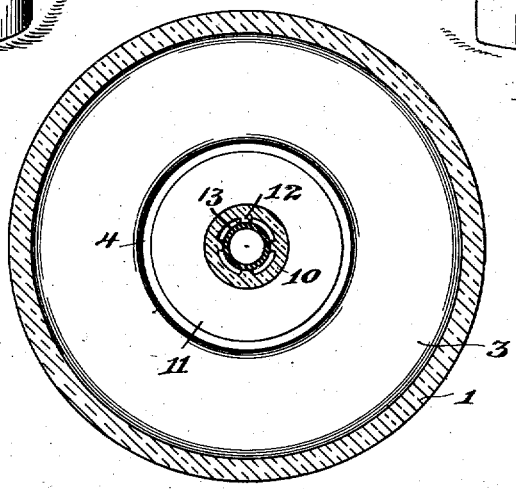
Figure 2:
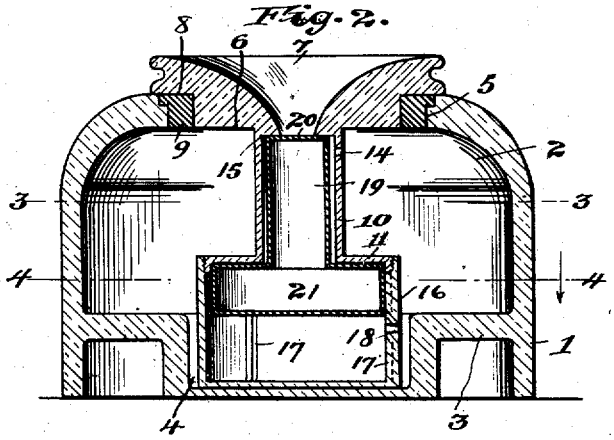
Figure 5:
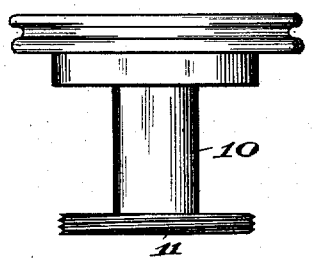
Figure 4:
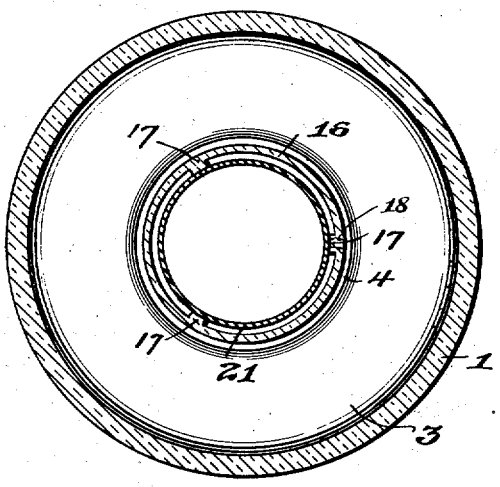

In the drawings, Figure 1 is an elevation of an inkstand embodying the features of the invention. Fig. 2 is a transverse vertical section of the same. Fig. 3 is a horizontal section taken in the plane of the line 3 3, Fig. 2. Fig. 4 is a horizontal section taken in the plane of the line 4 4, Fig. 2. Fig. 5 is a detail elevation of a closing device for the improved inkstand. Fig. 6 is a detail perspective view of an ink-chamber which is detachably connected to the closing device. Fig. 7 is a detail perspective view of a feed-controller forming part of the improved device.

Similar numerals of reference are employed to indicate corresponding parts in the several views.

The numeral 1 designates the body of the improved inkstand, which is formed of suitable material, preferably glass, and has a main chamber 2 therein for receiving ink. In the present construction a part of the bottom 3 of the body of the inkstand is elevated and at the center is depressed to provide a seat 4. The top of the body 1 has an opening 5 therein to receive a closure 6, having an upper funnel-mouth member 7, formed with a peripheral shoulder 8, between which and the wall of the opening a rubber or other securing gasket 9 is interposed to form a tight joint and prevent the entrance of air into the body of the inkstand at this point. Depending centrally from the member 7 is a tubular neck 10, having a lower horizontal flange 11 with a screw-threaded periphery. The inner portion of the neck 10 is constructed with a series of ribs 12 (see Fig. 3) to provide grooves 13, through which ink is vertically forced in a manner which will be presently set forth. The neck 10 at a point adjacent to the bottom of the member 7 is formed with an air-vent 14, through the medium of which the chamber 2 is regularly supplied with air through the member 7. Said vent also forms a restricted overflow-passage through which ink forced into the dip recess or chamber flows back to the main chamber. At the point of intersection of the neck 10 with the bottom of the member 7 an inwardly-projecting circumferential deflector-stop 15 is located and surrounds the lower contracted opening of said member. Removably attached to the flange 11 of the neck 10 is a fountain-chamber 16, which rests in the depressed seat 4, constructed in the bottom of the body. This fountain-chamber has a series of vertical ribs 17 therein to serve as guides, and through one of the ribs and the adjacent part of the side wall of the chamber a feed-opening 18 is formed to establish communication between the chamber 2 and the chamber 16 and whereby ink from said chamber 2 may regularly feed into the chamber 16. The closure 6 as an entirety and the chamber 16 will be preferably formed of glass, though other material may be used, and within the neck 10 and the said chamber 16 a buoyant feed-controller is located and comprises a vertical pressure-tube 19, with a closed top 20 and the lower hollow float 21, with which said tube communicates. This feed-controller is preferably formed of hard rubber and before it is disposed in the inkstand has air forced thereinto to render it buoyant. The diameter of the pressure-tube 19 is approximately equal to the distance between the ribs 12 of the neck 10 and closely engages said ribs, and the diameter of the float 21 is about equal to the distance between the ribs 17 in the chamber 16. The feed-controller is readily depressible, and after pressure is relieved therefrom it will rise to a normal position or so that the upper closed end of the pressure-tube 19 will bear agains the stop 15 and seal the dip-opening, and when in this position the bottom of the float 21 is above the opening 18 in the feed-chamber 16 to permit the ink from the chamber 2 to regularly flow or feed into the said fountain-chamber 16 proportionately to the amount of ink used.

The neck 10 is secured to the upper end of the chamber 16 after the feed-controller has been disposed in the said neck and chamber, and ink is then poured into the chamber 2 in any quantity desired, and it will be understood that said chamber may be completely filled up to the level of the air-vent 14. The closure carrying the remaining part is then disposed in the opening 5 and secured in place, the diameter of the chamber 16 being such as to readily pass through the said opening. The ink flows from the chamber 2 through the opening 18 into the chamber 16 and raises the feed-controller to normal position, and the upper closed end 20 of the pressure-tube 19 is held in close relation to the stop 15, thereby preventing the entrance of dust into the ink or evaporation of the latter.

In the use of the improved inkstand the pen is applied to the closed top 20 of the tube 19 and the controller forced downwardly, and the pressure of the float 21 on the ink in the chamber 16 will cause said ink to rise through the grooves 13 of the neck 10 and become applied to the pen. The depression of the controller causes the float 21 to move over and close the opening 18, and at the same time the air-vent 14 is cleared, and when the pen is released or removed from the upper closed end 20 of the tube 19 the controller assumes its normal position, and the used ink, or that taken from the inkstand, is replaced in the chamber 16 immediately after the elevation of the float 21, so that the ink in the chamber 16 is regularly maintained in quantity sufficient to dispose the controller in normal position as long as the ink in the chamber 2 and seat 4 is above the level of the opening 18. As soon as the feed-controller is depressed and the ink enters the space above its upper end the ink begins to flow to the main chamber through the vent 14. So, also, as soon as the controller begins to rise the ink is drawn back through the grooves 13, so that before the feed-controller has fully risen the ink has all receded from the dip-recess. The flange 11 is of material importance in the operation of the improved stand, in view of the fact that it prevents the ink from spurting or being forced upwardly with too great pressure through the grooves 13 of the neck 10. Furthermore, the parts are so proportioned that the distance between the stop 15 and the under side of the flange 11 will be equal to the distance between the upper surface of the top 20 of the pressure-tube 19 and the top of the float 21, and when the closed top 20 of the tube 19 is in engagement with the stop 15 the top of the float 21 will bear against the under side of the flange 11. Such construction economizes space in the fountain-chamber, but is not essential. It will also be seen that the ribs 12 and 17 prevent the controller from having lateral movement, so that the ink cannot pass up between the neck 10 and the pressure-tube 19, except through the grooves 13. When the controller is depressed, the float 21 causes the ink to rise between the ribs 17 and pass over the top of said float and then upwardly through the grooves 13. By the employment of the air-vent 14 the return of the controller to normal position is insured by reason of the fact that suction is overcome or any tendency toward the formation of a vacuum which might hold the controller in depressed position is prevented.

The several parts of the inkstand can be readily separated for cleaning and changes in the form, as well as proportions and dimensions, may be resorted to without departing from the spirit of the invention.

Having thus fully described the invention, what is claimed as new is—

1. An inkstand of the class set forth comprising a body, a closing member therefor having an opening therethrough and a depending tubular neck with a lower horizontal flange, an ink-chamber connected to said flange and having communication with the body, and a feed-controller movably mounted in the neck and ink-chamber, the said controller comprising a vertical pressure-tube, and a lower float.

2. In an inkstand of the class set forth, the combination of a body having a seat in the center of the bottom thereof, a hopper-like closure with an opening therethrough provided with a depending neck having an air-vent therein and a lower horizontal flange, an ink-chamber disposed in said seat and secured to the flange and having communication with the body, and a buoyant controller movably mounted in the said neck and ink-chamber.

3. An inkstand comprising a body forming a reservoir to receive ink, a closure for the body having a depending tubular neck with a lower flange, the said neck being provided with vertical grooves, an ink-chamber connected to said flange and having vertical grooves therein, and an opening communicating with the reservoir, and a buoyant controller mounted in the said neck and ink-chamber.

4. An inkstand comprising a body having a chamber therein, a closure for the body having an opening therethrough and a depending tubular neck with vertical grooves and an air-vent, an ink-chamber connected to the lower part of said neck and having communication with the chamber of the body, and a buoyant feed-controller comprising a vertical pressure-tube movable in the neck, and a lower float movable in the ink-chamber, the pressure-tube and float being secured to each other.

5. In an inkstand, the combination of a body having a chamber therein and an upper opening, a closing member for the said body having an opening therethrough and a stop extending around the said opening, the said closing member also having a depending neck with a lower horizontal flange, an ink-chamber removably secured to said flange and having communication with the body-chamber, and a buoyant feed-controller having portions movable in the said neck and ink-chamber.

6. In an inkstand, the combination of a body having a chamber therein, a closure for the said body having an opening therethrough and a depending tubular neck provided with an air-vent and a lower horizontal flange, the neck being formed with vertical grooves, an ink-chamber having its upper end connected to said flange and provided with internal ribs through one of which and the adjacent portion of the chamber an opening is formed, and a buoyant feed-controller comprising a vertical pressure-tube with an upper closed end and a lower float member.

7. An ink-well having a main chamber, a closure for the upper end thereof provided with a dip-opening, a fountain-chamber arranged within the main chamber and having communication with the lower part of the latter through a restricted passage, a tubular extension rising from the fountain-chamber to said top-closure and at its upper end surrounding the dip-opening, and having a vent affording communication between the upper part of the main chamber and the space normally occupied by the upper end of a float extension, a float within the fountain-chamber having an upper extension rising, when the float is natant to the dip-opening and closing the latter, means forming a passage leading from the fountain-chamber to the dip-opening and a deflector-stop arranged to overhang the delivery end of said passage.

8. In a fountain ink-well, the combination with a main body having a main chamber and a top cover therefor provided with a dip-opening, of an upwardly-pressed feed-controller within the well normally closing said dip-opening, a functionally stationary member surrounding the upper end of said feed-controller and forming therewith, when the feed-controller is depressed, a dip-recess, said surrounding member being provided with a vent leading from said dip-recess radially outward to said main chamber, and a fountain-chamber inclosing said feed-controller and means forming one or more ducts leading from the fountain-chamber to said dip-recess, whereby ink is circulated from the fountain mechanism into the dip-recess and thence through said vent back into the main chamber when the feed-controller is depressed.

9. In a fountain ink-well, the combination with a main body having a main chamber and a top cover therefor provided with a dip-opening, of a yieldably-held feed-controller arranged within the well and provided at its upper end with a sealing-surface devoid of ink-retaining cavities and normally engaging the perimeter of, and closing said dip-opening, an annular member surrounding the upper end of said feed-controller and forming therewith, when the feed-controller is depressed, a dip-recess, a fountain mechanism comprising a fountain-chamber arranged within the main chamber and having communication with the latter through a restricted opening, and means forming one or more ducts leading from the fountain-chamber upwardly to, and discharging into said dip-recess at a point or points radially outside of the sealing-surface of the feed-controller during the depression of the float.

GUSTAV J. SENGBUSCH.

Witnesses:
ALBERT H. GRAVES,
SAMUEL A. HYERS.